Figure 13:
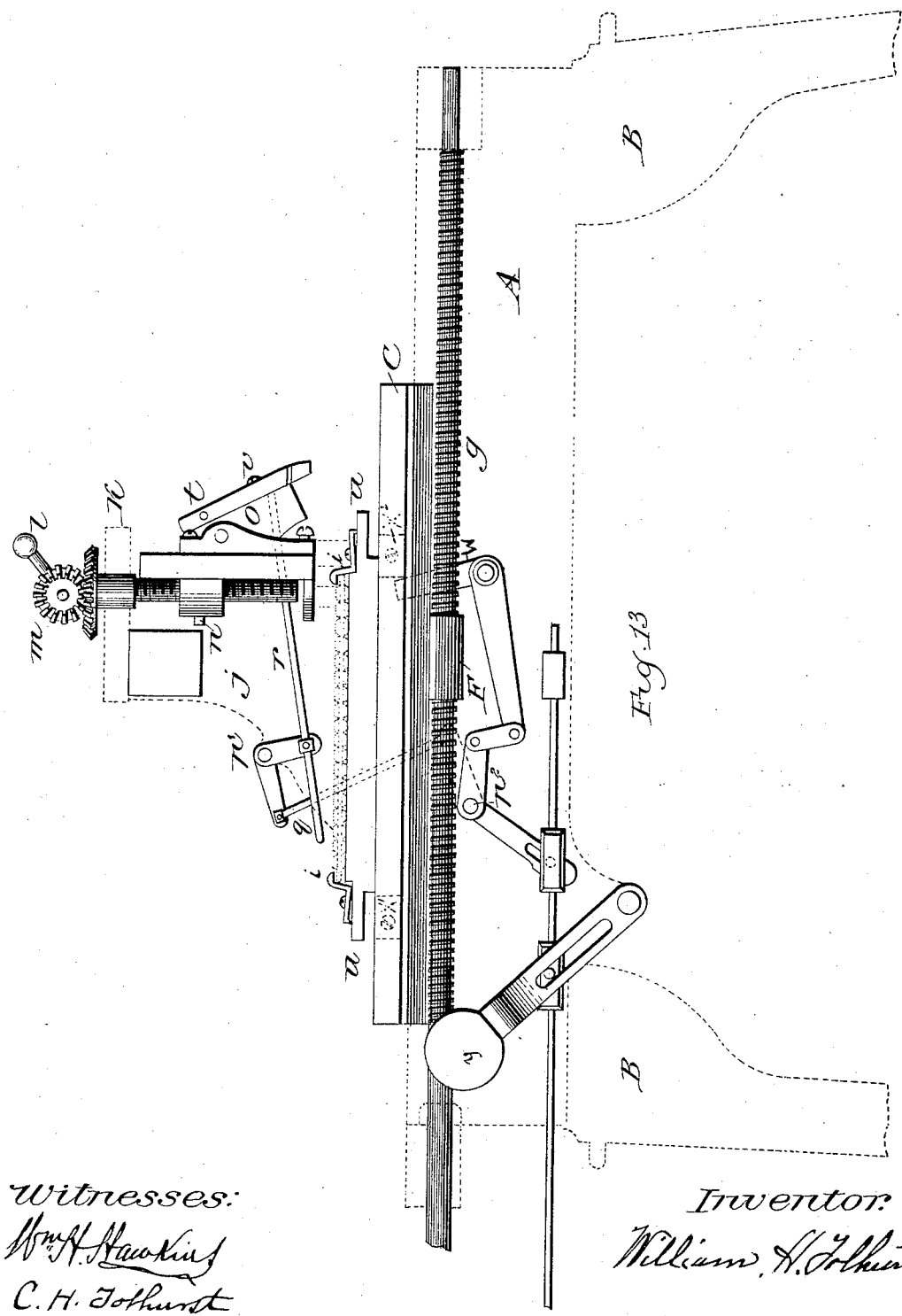

(No Model.)  2 Sheets—Sheet 1.
W. H. TOLHURST.
CUTTER OSCILLATING MECHANISM FOR POWDER SHAPING MACHINES.
No. 341,113. Patented May 4, 1886.
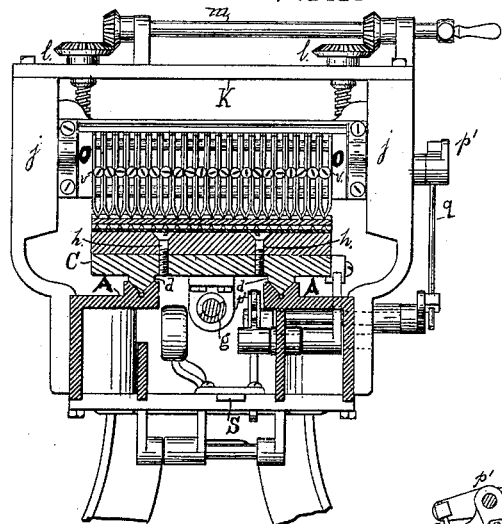
FIG. 3.
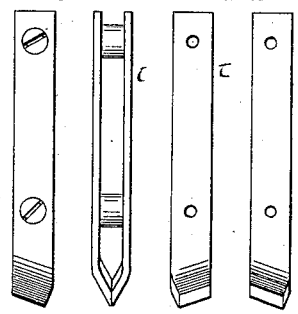
FIG. 4.  FIG. 5.  FIG. 7.
FIG. 8.
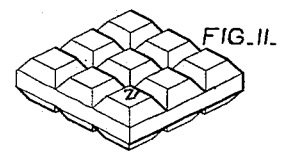
FIG. 9.
FIG. 10.
FIG. 6.
FIG. 11.
FIG. 12.
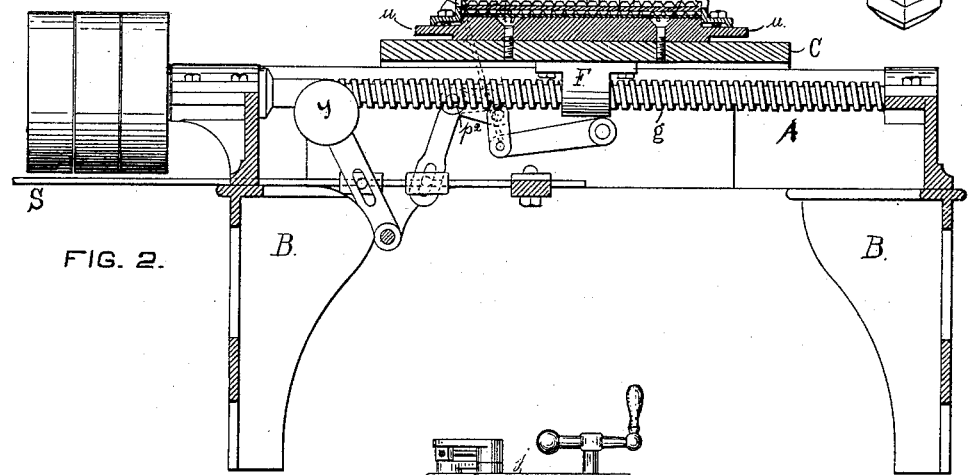
FIG. 2.
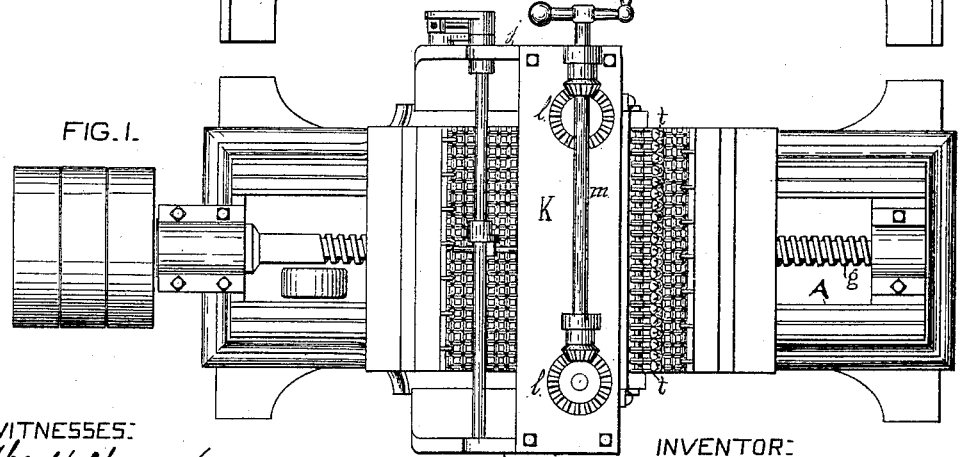
FIG. 1.
WITNESSES:
Wm H. Hawkins
C. H. Tolhurst
INVENTOR:
William H. Tolhurst (No Model.) 2 Sheets—Sheet 2.

W. H. TOLHURST.
CUTTER OSCILLATING MECHANISM FOR POWDER SHAPING MACHINES.

No. 341,113. Patented May 4, 1886.

Witnesses:
Wm H. Hawkins
C. H. Tolhurst

Inventor:
William H. Tolhurst

UNITED STATES PATENT OFFICE.

WILLIAM H. TOLHURST, OF TROY, ASSIGNOR TO THE SCHAGHTICOKE POWDER COMPANY, OF SCHAGHTICOKE, NEW YORK.

CUTTER-OSCILLATING MECHANISM FOR POWDER-SHAPING MACHINES.

SPECIFICATION forming part of Letters Patent No. 341,113, dated May 4, 1886.

Application filed July 29, 1885. Serial No. 173,003. (No model.)

*To all whom it may concern:*

Be it known that I, WILLIAM H. TOLHURST, a citizen of the United States, residing at Troy, in the county of Rensselaer and State of New York, have invented a new and useful Cutter-Oscillating Mechanism for Machines for Forming Cakes of Gunpowder into Polyhedral Blocks or Grains, of which the following is a specification.

My invention relates to improvements in an ordinary planing-machine, in which the vertically-adjusted cutter or cutters operate in conjunction with a movable platen; and the objects of my improvements are to produce a sliding cutting movement, for the purpose of channeling flat cakes of gunpowder in such manner that the same can be readily converted into polyhedral blocks or grains, and to prevent said cutter or cutters coming in contact with said cake of gunpowder, except during the process of cutting or channeling the same. I attain these objects by the mechanism illustrated in the accompanying drawings, in which—

Figure 1 is a top view of the entire machine. It also shows the cutter-head so adjusted as to cause the cutters thereto attached to clear the cake of gunpowder during the backward movement of the platen upon which it is carried. Fig. 2 is a longitudinal sectional view of the entire machine and cake of gunpowder thereto attached and channeled on both its sides and both ways. Fig. 3 is a cross-sectional view of the machine, showing a cake of gunpowder thereto attached and channeled on one of its sides. Fig. 4 is a side view of a cutter in readiness for adjustment upon the cutter-head. Fig. 5 is an end elevation of the cutter. Fig. 6 is a view of a gage for use in adjustment of the cutters upon the cutter-heads. Fig. 7 is a view in perspective of the two blades of steel or other suitable material, and which, united, form the cutter shown in Fig. 5. Fig. 8 is a sectional view showing the manner of fastening together the blades of the cutter. Fig. 9 is a view of the collar placed between the blades of the cutter when fastened together, as shown in Fig. 5. Fig. 10 is a view in perspective of the set-screws employed to fasten the blades, Fig. 7, of the cutter together, as shown in Fig. 8. Fig. 11 is a view in perspective of a cake of gunpowder as it appears after being cut or channeled by said cutters. Fig. 12 is a view in perspective of one of the polyhedral blocks or grains into which the said cake of gunpowder may be readily broken when cut or channeled on both its sides, as shown in Fig. 11.

Similar letters refer to similar parts throughout the several views.

The bed-plate A, its legs or standards B B, and sides $j\,j$ constitute the frame-work of the machine. The platen C rests upon the bed-plate A, its parallel V-shaped ribs $d\,d$ resting in corresponding grooves cut into and lengthwise of the bed-plate A, and is carried backward and forward upon the bed-plate by rotating the longitudinal screw $g$ to the right or left through the nut F, which is firmly fastened to the platen C.

Upon the platen C the chuck $u$ is fastened by means of the screws $h\,h$, said chuck having the clamps $i\,i$.

Suspended from the plate K, which rests upon the sides $j\,j$ of the machine, by means of the twin screws $l\,l$, upon which it is vertically adjustable by means of the rotary motion imparted to said screws by the geared shaft $m$, is the cutter-head carriage $n$. To this carriage is pivoted the oscillating cutter-head O, to which are fastened the cutters $t\,t$ by set-screws $v$, as shown in Figs. 2, 3, 13.

Fig. 13 is a longitudinal sectional view of the entire machine. It shows the cutter-head and cutting-tool raised at the end of the forward movement of the platen, the mechanism which raises said cutter-head, and the counterweight which overcomes the pressure of said cutter-head upon said mechanism while it is thus raised and during the backward movement of said platen.

The cutters $t\,t$ are shown in detail in Figs. 4, 5, 7.

The mode of operation is as follows: When the platen C is at the end of its backward movement, a cake of gunpowder of uniform thickness is fastened upon the chuck $u$ by clamps $i\,i$, said chuck being fastened to said platen by set-screws $h\,h$. The cutter-head carriage $n$ is vertically adjusted upon the twin screws $l\,l$ by means of the geared shaft $m$, thus bringing the cutters $t\ t$, which are fastened to the cutter-head O, which is pivoted to said carriage, in contact with the substance to be cut or grooved. The operation of cutting begins with the forward movement of the platen C, which movement is produced by the rotating of the longitudinal screw $g$ in the nut F, which nut is fastened to the platen C. The forward movement of said platen continues until the lug on said platen (indicated by $x'$, Fig. 13) strikes and forces forward the belt-shifting lever $w$, which actuates the belt-shifting apparatus S, which causes the screw $g$ to be reversed and start the platen C on its backward movement. The lever $w$ being mounted on a rock-shaft, when it is forced forward by the lug $x'$, it operates through the intermediately connecting bell-crank $p^2$, the connecting-rod $q$, which rod is connected to a rock-shaft, which carries a trip-lever, $r$, which in turn is actuated by the bell-crank $p'$, the free end of the trip-lever $r$ being thereby forced against the cutter-head O, which it at the same time raises and holds in that position during the backward movement of the platen C, the weight of the cutter-head O while in that position—upon the free end of the trip-lever $r$—being overcome by the counter-weight $y$, which, mounted on a rock-shaft, is actuated by the belt-shifting apparatus S, its free end being thrown forward when the lever $w$, actuated by the lug $x'$, operates the belt-shifting apparatus S through intermediate connections. The backward movement of the platen C, produced by the reversal of the screw $g$, as aforesaid, brings the lug on said platen (indicated by $x^2$, Fig. 13) in contact with and it forces back the lever $w$, thereby restoring the trip-lever $r$, bell-crank $p^2$, connecting-rod $q$, bell-crank $p'$, belt-shifting apparatus S, and counter-weight $y$ to the same relative positions they sustained to each other during the forward movement of the platen C. The free end of the trip-lever $r$, when that lever is actuated by the operating of the lever $w$ by the lug $x^2$, is withdrawn from contact with the cutter-head O, which at the same time swings back against the carriage $n$, which position it retains until, during the reverse or forward movement of the platen C, the trip lever $r$ is again actuated by the operating of the belt-shifting lever $w$ by the lug $x'$, which causes the free end of the trip-lever $r$ to raise the cutter-head O, as aforesaid. By means of a downward feed motion, with which is combined an adjustable distance-gage for the purpose of preventing the cutters $t\ t$ descending so far as to chip or fracture the cake of gunpowder in channeling the same, the cutters $t\ t$ are again adjusted, the platen C put in motion, and the process of channeling the cake of gunpowder repeated until cut to the required depth, the channels crossing each other at right angles. The cake is then reversed upon the chuck $u$, and the side thus brought in contact with the cutters $t\ t$ is channeled in the same manner, so that when the process of channeling is completed the cake of gunpowder may be readily broken into polyhedral blocks or grains, as shown by Z', Figs. 11, 12.

What I claim as my invention, and desire to secure by Letters Patent, is—

The combination, in a planing-machine, of the swinging cutter-head O, carrying the cutters $t\ t$, and secured to the vertically-adjustable cutter-head carriage $n$, with the bell-cranks $p'\ p^2$, connecting-rod $q$, and trip-rod $r$, substantially as shown, for the purpose specified.

WILLIAM H. TOLHURST.

Witnesses:
 WM. H. HAWKINS,
 C. H. TOLHURST.